United States Patent
Leathers

(12) 
(10) Patent No.: US 6,728,697 B2
(45) Date of Patent: Apr. 27, 2004

(54) PARTIAL DELEGATION OF COMPLEX OLAP QUERIES WITH APPLICATION TO ZERO SUPPRESSION CONDITION EVALUATION

(75) Inventor: Burton Leathers, Nepean (CA)

(73) Assignee: Cognos Incorporated, Ottawa (CA)

(*) Notice: Subject to any disclaimer, the term of this patent is extended or adjusted under 35 U.S.C. 154(b) by 95 days.

(21) Appl. No.: 09/751,786

(22) Filed: Dec. 29, 2000

(65) Prior Publication Data

US 2002/0087524 A1 Jul. 4, 2002

(51) Int. Cl.[7] .............................. G06F 17/30; G06F 7/00
(52) U.S. Cl. ..................................... 707/2; 707/4; 707/5
(58) Field of Search .................................. 707/1–5, 103, 707/101, 200–206; 380/54, 59; 382/233; 709/200, 201, 202, 203

(56) References Cited

U.S. PATENT DOCUMENTS 5,918,232 A * 6/1999 Pouschine et al. .......... 707/103
6,275,818 B1 * 8/2001 Subramanian et al. ......... 707/2

* cited by examiner

*Primary Examiner*—Nyen Le
*Assistant Examiner*—Susan Chen
(74) *Attorney, Agent, or Firm*—Pearne & Gordon LLP

(57) ABSTRACT

The present invention introduces a mechanism to partition the processing work required on data from a variety of proprietary OLAP data sources in such a way that as much as possible of the processing can be carried out by the OLAP data source, thereby improving the efficiency of the delegated portion of the operations, and making more effective use of the overall processing power of the computing facilities. By decomposing the required high level expressions into sub-expressions to be applied to data elements some part of the expressions can be evaluated by the OLAP data source. The results of these sub-expressions are combined by the OLAP data engine to produce the same result as the original full expression. 'Rows' and 'columns' of the original cross-tabulation formed from the data are classified as either simple—meaning the expression can be processed at the OLAP data source or complex—meaning such expressions cannot be computed at the OLAP data source.

12 Claims, 3 Drawing Sheets

PARTIAL DELEGATION OF COMPLEX OLAP QUERIES WITH APPLICATION TO ZERO SUPPRESSION CONDITION EVALUATION

TECHNICAL FIELD

The present invention relates to the field of computing. More particularly, it relates to a method for performing analysis of data.

BACKGROUND OF THE INVENTION

On-Line Analytical Processing (OLAP) is a technology that allows end-users to retrieve data efficiently from one or more data warehouses for decision-support purposes. A data warehouse can be defined as an on-line repository of enterprise data used to support decision making OLAP transforms data warehouse data into strategic information. Data warehouses tend to be extremely large—hundreds of gigabytes to terabytes in size. Information in a data warehouse is usually multidimensional in nature, and end-users require the capability to view that data from a variety of perspectives.

In this milieu, aggregated and summarised data are much more important than detailed records. Queries tend to be complex and ad-hoc, often requiring computationally expensive operations such as joins and aggregation. Further complicating this situation is the fact that such queries must be performed on tables that potentially have millions of records. Moreover, the results have to be delivered interactively to the end-user who expects rapid response times.

OLAP enables end-users to gain insight into data through fast, interactive views of information. As well as the ability to answer "who?" and "what?" questions they have ability to answer "what if?" and "why?"

Given these characteristics and the consequent processing requirements, it is clear that there must be ongoing development emphasis in OLAP systems in the area of query processing and response times. Processing is critical in such an environment, and any measures that improve the efficiency of processing are welcome, as they also serve to reduce the response times for the end-user.

SUMMARY OF THE INVENTION

According to the invention, there is provided a computer-based method for analyzing data comprising the steps of: at a central application platform: a) receiving from an end-user a query; b) dividing said query into a number of partial queries; c) designating said partial queries as simple or complex as appropriate; c) sending said simple queries to one or more OLAP data sources for evaluation; d) emulating the evaluation of partial queries not of the simple type; e) receiving from said OLAP data sources the results of the evaluation from step c); and f) combining the results of said evaluations and said emulation; and at one or more OLAP data sources; g) receiving from a central application platform one or more requests to evaluate simple queries; and h) transferring to said central application platform the results of evaluating said simple queries.

PREFERRED EMBODIMENT

Figure 1:
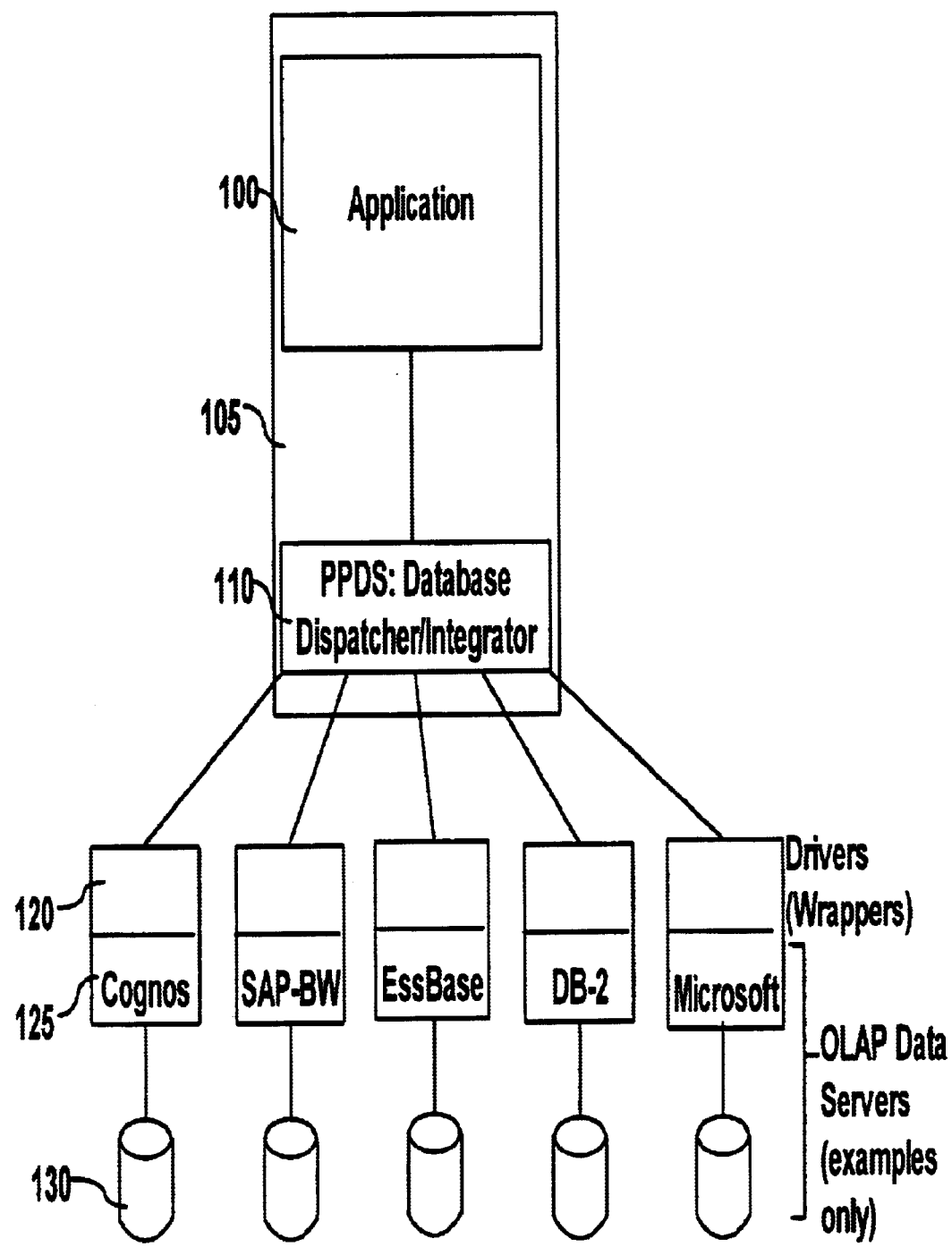
FIG. 1 shows a simplified version of a typical multiple processing system for use with this invention.

One of the critical areas of OLAP data retrieval lies in providing OLAP data engines which are capable of accessing data from a variety of proprietary OLAP data sources and delivering them in a standard form through a generic OLAP user interface to an OLAP user interface and data presentation facility. Such OLAP data engines provide a generalized view of, potentially, very different OLAP data sources. The engines make it simple for presentation facilities—the decision support tools with which the end-user interacts—to define the data which are to be retrieved, but they tend to incur a performance cost by reducing the semantic capabilities of the data access method to conform to the least capable of the various OLAP data sources supported.

The negative effects of reducing the capabilities of the general interface can, in some measure, be reduced or mitigated by providing a richer semantic content in the general interface and providing emulation facilities which provide the appearance of delivering the rich semantic capabilities directly, but in fact do so by decomposing the high level requests (functions) into the low level capabilities (functions) compatible with the least capable OLAP data source. A high level request is defined here as being an operation that may be implemented using several primitive or low level functions. The high level functions can then be mapped directly to the functions of highly capable OLAP data sources while the emulation facility deals with mapping the high level functions to low level functions for the less capable OLAP data sources.

This approach can significantly improve the operational efficiency of an OLAP data engine which provides a common interface to diverse OLAP data sources but the all or nothing approach to the delegation of high level calls to the OLAP data source is still not satisfactory. What is needed is a way to partition the processing work required in such a way that as much as possible of the processing can be carried out by the OLAP data source, thereby improving the efficiency of the delegated portion of the operations, and making more effective use of the overall processing power of the computing facilities.

The present invention introduces a mechanism to meet this need. Examination of the problem led to the realisation that it is possible to decompose the required high level expressions into sub-expressions to be applied to data elements in such a way that some part of the expressions can be evaluated by the OLAP data source. The results of these sub-expressions can then be combined by the OLAP data engine to produce the same result as the original full expression. These sub-expressions are less powerful than the high-level functions exposed by the OLAP data engine but more powerful than the primitives previously used for the least capable OLAP data sources.

Strategies whereby queries are processed in a distributed manner, so-called "divide and conquer" strategies are known in the art. However, these query decompositions have been applied in more traditional situations to break a query that involves many range variables into a sequence of smaller queries using the principles of 'detachment' and 'tuple substitution'. This approach is not particularly helpful in the situations where the present invention is used.

The key to implementing the present invention is to partition the 'rows' and 'columns' of the original cross-tabulation formed from the data into the two classifications, namely, simple—meaning the expression can be processed at the OLAP data source, and complex—meaning such expressions cannot be computed at the OLAP data source.

The cross-tabulation then effectively comprises four quadrants or segments, one of which—the Simple-Simple—can be processed in terms of the high level operation directly by one or more OLAP data sources. FIG. 1 illustrates this showing the rows and columns sorted as described. It is not necessary to actually carry out this sort, but only to partition the elements so as to identify those that would reside in the relevant quadrant.

The partitioning and delegation method has been found to be effective for two reasons:

In most instances, the bulk of the cross-tabulation falls within the simple—simple quadrant The saving achieved by delegating the high level operation to the OLAP data source is several times the cost of the work required to partition and prepare the request for delegated operation The present invention reduces the computational effort, and consequently decreases the time, required to perform high level which are intrinsically costly when performed entirely in terms of emulation operations.

AN EXAMPLE

One of the more useful operations to be performed to assist in the analysis of OLAP data is termed "zero-suppression", that is, the effective removal of all rows and columns all of whose cells are zero. There is a more general requirement to suppress other data of comparable utility (or lack thereof) such as data that are invalid or null, data which have not been recorded—i.e. where the cells are empty of values, and data that are 'non-computable' (e.g. results from a division by zero); all of which might be termed 'non-significant' data. This requirement is also intended to be encompassed by the present invention.

One approach to zero suppression is to make an a priori determination of which rows and columns contain only zero (or otherwise non-consequential) values. The resulting status data—a boolean value indicating whether a row has any non-zero data—can then be used to condition subsequent operations. It may be seen that in the case of partial delegation, each row and column has two status values—one for the simple elements and one for the complex elements—which can be combined through a simple boolean operation to yield the value for the entire row or column.

The zero suppression example is one which best illustrates the value of partial delegation because most OLAP data sources can ascertain that a row or column has no relevant data far more efficiently than it can actually retrieve the data. The partial delegation method is thus significantly better than the emulation method in which there is no choice but to retrieve all the data in the table in order to make the status determination.

A typical environment for this invention is illustrated in FIG. 1. Here a general purpose computing facility known as the central applications platform 105 is used. An application 100, "PowerPlay" by Cognos being typical, is capable of retrieving data from a number of OLAP data sources comprising software 125 and associated data 130, available from various vendors including Microsoft, IBM, and Cognos, among others. This retrieval is carried out through the PowerPlay Data Services (PPDS), the PowerPlay OLAP data engine, 110, which acts as a database dispatcher and integrator. This module dispatches requests, as required, to the various OLAP data sources 125, having first formulated the requests in an appropriate manner. The PPDS then integrates the responses from the OLAP data sources 125 and presents the results to the application 100. In order to facilitate the use of different OLAP data sources, the PPDS accesses the OLAP servers 125 through a standardised interface. A driver or conversion wrapper 120 is provided for the different types of OLAP data source supported. Each driver 120 converts the request from the PPDS to a form suitable for the specific OLAP data source.

The invention is implemented in the application 100 and the PPDS database dispatcher and integrator 110.

In this description, for convenience, the data are presumed to be accessed from a single OLAP data source, whereas, in general, one or more such sources may be used for a transaction. The description should therefore be read with this in mind.

Figure 2:
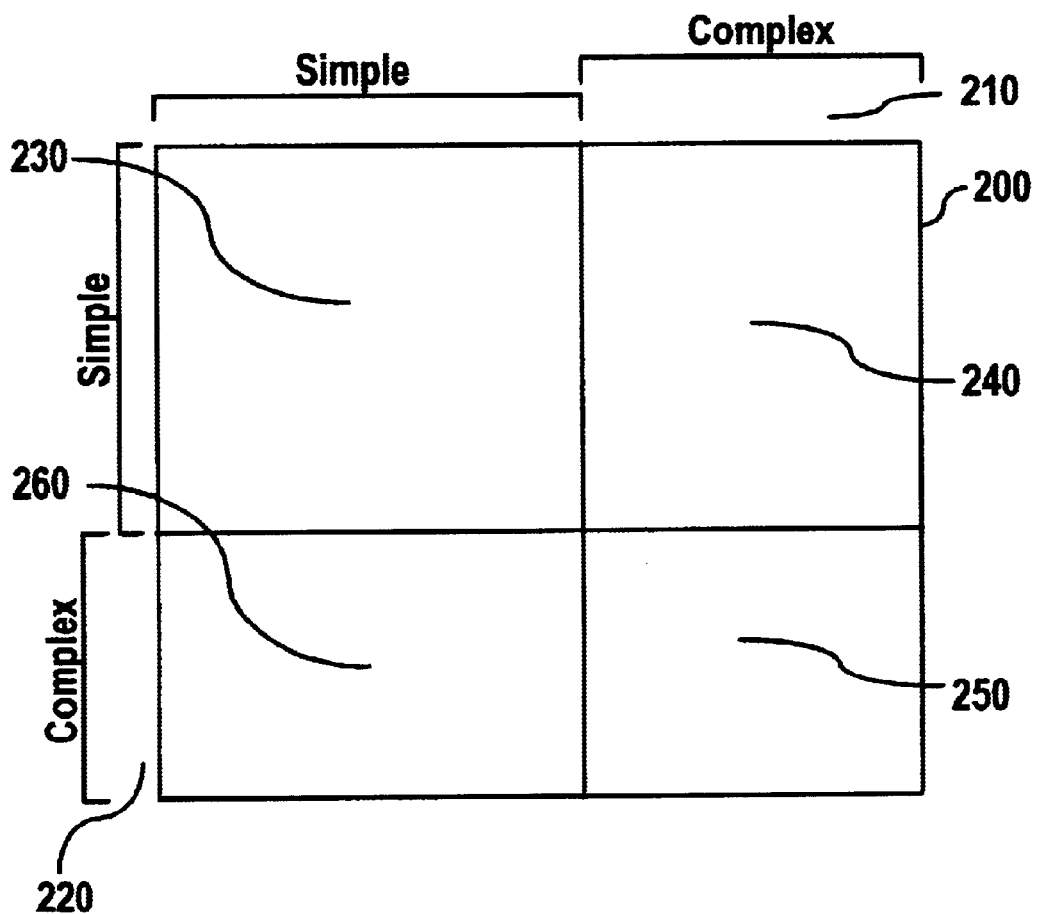
FIG. 2 illustrates how the data cross-tabulation is divided into quadrants, based on the criterion of Simplicity (vs. Complexity) for both Rows and Columns.

Referring to FIG. 2, conceptually the cross-tabulation data may be considered as a matrix 200 where the rows 220 and columns 210 are partitioned into the categories as previously defined and described: Simple and Complex. Data in the quadrant with both rows and columns in the Simple category are candidates for delegation of part of the process of zero-suppression.

When the user indicates through the application that a particular feature is to be employed, for example, to view data with row and columns containing all zeros omitted or suppressed, a series of OLAP data source accesses takes place. The invention takes advantage of the ability to apply the requested operation on the data being accessed at the OLAP data source wherein the data are stored. When data are requested, the PPDS constructs an appropriate data query and ensures that the query is valid for that specific OLAP data source. The PPDS is aware of the limitations of each of the OLAP data sources in this respect. At the conclusion of the various operations, the PPDS assembles the results of the operations against the OLAP data source—whether attained through delegated operation or emulation—and present a unified result to the user through the application.

Query Normalization and Partitioning

The task of partitioning the table into the quadrants upon which delegated operation depends is only feasible if it is possible to render the arbitrary queries in a form that facilitates efficient partitioning. The need for such transformation is a consequence of: the inherent richness of OLAP query expressions, at least as supported by the PPDS; the intrinsic limitations of particular OLAP data sources; and the particular form of representing OLAP queries within the PPDS.

The query expression that defines the value of any specific cell within an OLAP cross-tabulation can be an arbitrarily complex expression comprising one or more value queries and the use of arithmetic operators and diverse mathematical functions. Furthermore, an efficient representation of such a query entails factoring the full expression for a cell into (i) a row specific partial query, (ii) a column specific partial query and (iii) a table generic partial query—termed a context or slicer which provides appropriate query values for those dimensions which are not explicitly part of the row or column partial queries.

The need to normalize the queries prior to partitioning arises from the extreme flexibility of the query specification used within the PPDS. Many queries that are valid in the PPDS are not valid for many OLAP data sources. It is therefore necessary for the PPDS to transform the "query as received" into a form which is valid for the particular OLAP data source. When this is being done in terms of the emulation capability, which reduces all requests to the PPDS to the level of the least capable OLAP data source, the normalization is applied automatically. However, when the higher level functions are being delegated to the OLAP data source, the normalization must be applied to the partial queries.

Figure 3:
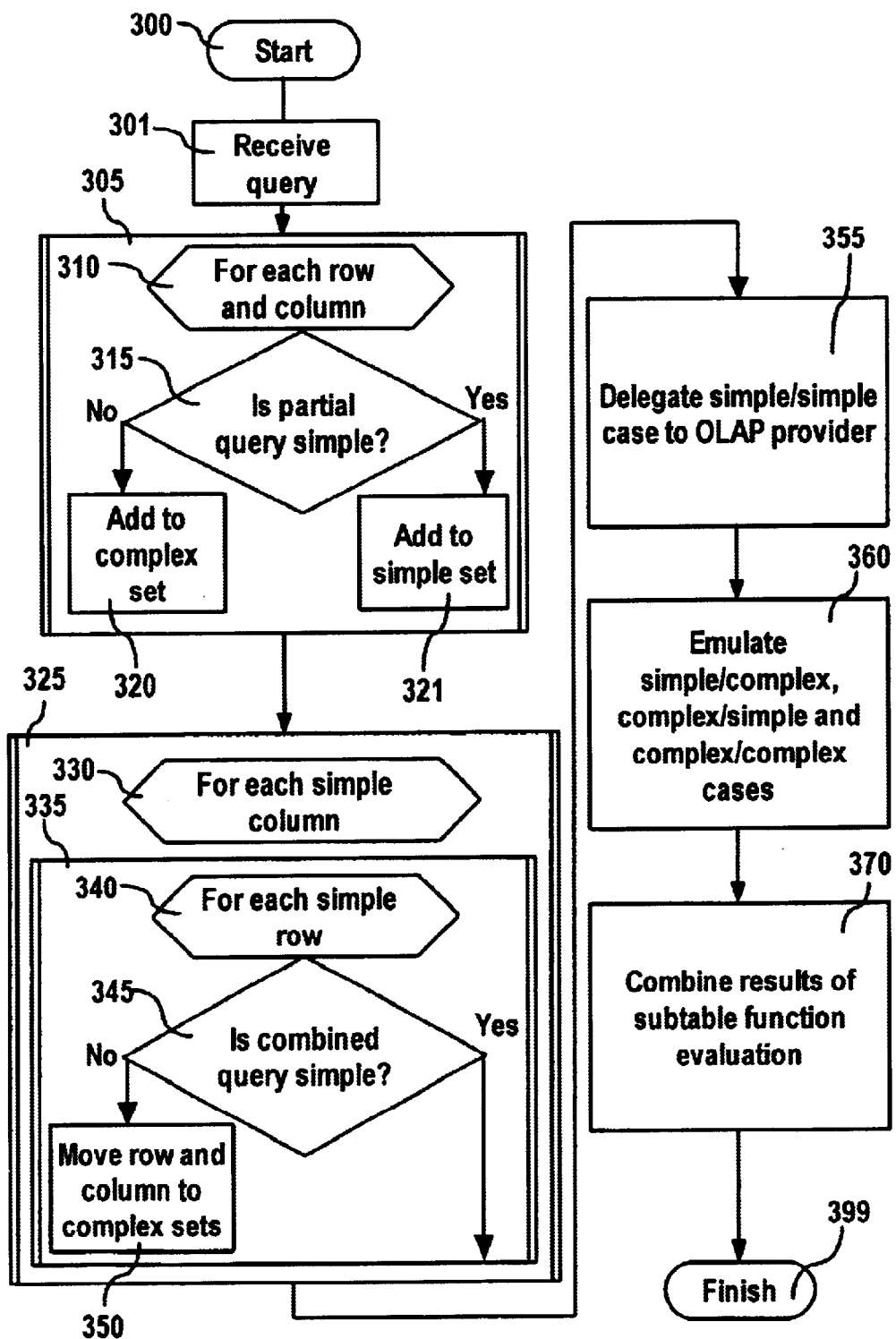
FIG. 3 is a flowchart linking the various activities and processes used in the invention.

We refer next to FIG. 3, which is a simplified flowchart showing the normal sequence of operations required to implement the invention. Once a query has been received, 300, 301, the rows and columns are subjected to normalization. This entails two sequential activities. The row and column partial queries are normalized individually 305. Any partial query that cannot be normalized causes the associated row or column 310 to be designated 315 as "complex" 320, otherwise it is designated "simple" 321. Once the row and column partial queries have been normalized, the PPDS must examine the row and column partial queries previously designated "simple" on a pairwise basis 325, i.e. it must determine whether the combination of the partial queries for a row 340 and column 330 would directly produce a normalized cell query. If it would not 345, then the row and column are marked as "complex", 350.

The result of the two normalization steps is the identification of those rows and columns that are 'complex' and, by inference, the identification of those that are 'simple'. The set of cells that have 'simple' row and column partial queries can then be delegated to be processed by the OLAP data source 355. The result of the processing by the OLAP data source can be combined with similar results 370 produced by processing the other three quadrants of the table using emulation methods 360. These combined results are then used to satisfy the request made by the end-user, and the query process ended, 399.

The invention can be implemented in digital electronic circuitry or in computer hardware, firmware, and software or in combinations thereof. Apparatus of the present invention can be inplemented in a computer program product tangibly embodied in a machine-readable storage device for execution by a programmable processor. The method of the present invention can be performed by a programmable processor executing a program of instructions to perform the functions of the invention by operating on input data and generating output.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A computer-based method applied at a central application platform for analyzing data from one or more on line analytical processing data sources, the method comprising the steps of:
    a) receiving from an end-user a query for retrieving data from an on line analytical processing data source;
    b) dividing said query into a plurality of partial queries;
    c) designating each of said partial queries as a simple partial query or a complex partial query as appropriate, a simple partial query being defined as one that can be processed by said on line analytical processing data source and a complex partial query being defined as one that cannot be processed by said on line analytical processing data source;
    d) sending one or more of said simple partial queries to said on line analytical processing data source for evaluation, and receiving a response from said on line analytical processing data source;
    e) evaluating said complex partial queries by emulation methods to produce results;
    f) combining the results of said evaluations of said complex partial queries with said responses from said on line analytical processing data sources to generate combined results; and
    g) presenting said combined results to an end-user.

2. The method of claim 1 wherein the designating step c) includes the steps of:
    i) normalizing said partial queries for each row and column of a cross-tabulation to create row partial queries and column partial queries;
    ii) designating each of said row partial queries and each of said column partial queries as a simple row partial query, a simple column partial query, a complex row partial query, or a complex column partial query as appropriate, a simple partial query being defined as one that can be processed by said on line analytical processing data source and a complex partial query being defined as one that cannot be processed by said on line analytical processing data source; and
    iii) examining said simple row partial queries and said simple column partial queries in a pairwise manner, to determine whether each simple row partial query and each simple column partial query combination would directly produce a normalized cell query, and if it would not, then changing the designations of each partial query in said combination to complex.

3. The method of claim 1 wherein step a) includes the step of:
    a1) receiving from an end-user a query for retrieving data from a plurality of on line analytical processing data sources;
and step d) includes the step of:
    d1) sending one or more of said simple partial queries to the appropriate one or more of said plurality of on line analytical processing data sources for evaluation, and receiving responses from said on line analytical processing data sources.

4. The method of claim 3 wherein each of said plurality of on-line analytical processing data sources is provided with a conversion wrapper, for converting requests from said central application platform to a form suitable for processing by said each of said plurality of on-line analytical programming data source.

5. The method of claim 3 wherein said each of said plurality of the on-line analytical processing data sources has different data processing capabilities.

6. The method of claim 5 wherein in the designating step c) the data processing capabilities of the least capable of said plurality of on-line analytical programming data sources is used to designate a partial query as simple or complex.

7. A computer system implemented at a central application platform for analyzing data from one or more on line analytical processing data sources, comprising:

a) means for receiving from an end-user a query for retrieving data from an on line analytical processing data source;
b) means for dividing said query into a plurality of partial queries;
c) means for designating each of said partial queries as a simple partial query or a complex partial query as appropriate, a simple partial query being defined as one that can be processed by said on line analytical processing data source and a complex partial query being defined as one that cannot be processed by said on line analytical processing data source;
d) means for sending one or more of said simple partial queries to said on line analytical processing data source for evaluation, and receiving a response from said on line analytical processing data source;
e) means for evaluating said complex partial queries by emulation methods to produce results;
f) means for combining said results of said evaluations of said complex partial queries with said responses from said on line analytical processing data sources to generate combined results; and
g) means for presenting said combined results to an end-user.

8. A computer program applied at a central application platform for analyzing data from one or more on line analytical processing data sources, comprising:
a) code for receiving from an end-user a query for retrieving data from an on line analytical processing data source;
b) code for dividing said query into a plurality of partial queries;
c) code for designating each of said partial queries as a simple partial query or a complex partial query as appropriate, a simple partial query being defined as one that can be processed by said on line analytical processing data source and a complex partial query being defined as one that cannot be processed by said on line analytical processing data source;
d) code for sending one or more of said simple partial queries to said on line analytical processing data source for evaluation, and code for receiving a response from said on line analytical processing data source;
e) code for evaluating said complex partial queries by emulation methods to produce results;
f) code for combining said results of said evaluations of said complex partial queries with said responses from said on line analytical processing data sources to generate combined results; and
g) code for presenting said combined results to an end-user.

9. A computer-based method for use at a central application platform for analyzing data from one or more on line analytical processing data sources, the method comprising the steps of:
a) receiving from an end-user a query for retrieving data from an on line analytical processing data source;
b) dividing said query into a plurality of partial queries;
c) designating each of said partial queries as a simple partial query or a complex partial query as appropriate, a simple partial query being defined as one in which meets a predetermined condition and a complex partial query being defined as one which does not meet said predetermined condition
d) sending one or more of said simple partial queries to said on line analytical processing data source for evaluation, and receiving a response from said on line analytical processing data source;
e) evaluating said complex partial queries by emulation methods to produce results;
f) combining said results of said evaluations of said complex partial queries with said responses from said on line analytical processing data sources to generate combined results; and
g) presenting said combined results to an end-user.

10. The method of claim 9 in which said predetermined condition in element c) is that all of the results of the partial query equal zero.

11. The method of claim 10 in which said predetermined condition in element c) is that all of said results of the partial query are non-significant.

12. The method of claim 11 in which said non-significant results are those that are null or invalid or empty or non-computable.

* * * * *